United States Patent

Mayes et al.

[15] 3,679,755
[45] July 25, 1972

[54] NITROSO ETHER POLYMERS

[72] Inventors: Nathan Mayes, Barrington, R.I.; Robert A. Falk, Rockaway, N.J.

[73] Assignee: Thiokol Chemical Corporation, Bristol, Pa.

[22] Filed: Nov. 29, 1968

[21] Appl. No.: 780,297

[52] U.S. Cl. ............260/615 BF, 260/29.6, 260/33.8, 260/487, 260/544 F, 260/92.1
[51] Int. Cl. .................................................C07c 43/00
[58] Field of Search............260/615 BF, 614 F, 92.1, 80.73, 260/92.1 A

[56] References Cited

UNITED STATES PATENTS

| | | | |
|---|---|---|---|
| 3,072,592 | 1/1963 | Crawford | 260/92.1 |
| 3,072,625 | 1/1963 | Borders | 260/92.1 |
| 3,197,451 | 7/1965 | Haszeldine et al. | 260/92.1 |
| 3,213,009 | 10/1965 | Crawford | 260/92.1 X |
| 3,321,454 | 5/1967 | Crawford | 260/92.1 |
| 3,399,180 | 8/1968 | Crawford | 260/92.1 |
| 3,436,384 | 6/1969 | Crawford | 260/91.1 |
| 3,472,822 | 10/1969 | Oliver et al. | 260/80.73 |

FOREIGN PATENTS OR APPLICATIONS

| | | | |
|---|---|---|---|
| 982,660 | 2/1965 | Great Britain | 260/92.1 |

OTHER PUBLICATIONS

Dyatkin et al., Dokl. Akad. Nauk. SSSR, Vol. 165, No. 6 pp. 1305–1308 1965

Dyatkin et al., Dokl. Akad. Nauk. SSSR, Vol. 168, No. 6 pp. 1319–1322 1966

*Primary Examiner*—Howard T. Mars
*Attorney*—Curtis, Morris & Safford

[57] ABSTRACT

Nitroso polymers are provided which are produced by reacting certain nitroso ether monomers. These polymers in turn yield novel polymers by converting, partially or substantially fully, pendant groups in the obtained polymer. The precursor polymers as well as the converted polymers are highly oxidation resistant. Elastomers can be produced directly from the precursor as well as the desired polymer. Liquid as well as solid polymers are provided. These polymers are represented by the following general formulas

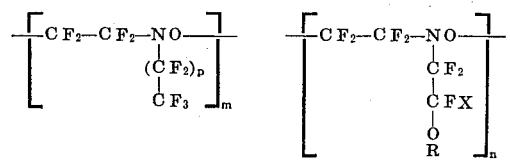

wherein R is lower alkyl; $p$ is 0 to 4; X is halogen; wherein the ratio of $m:n$ is 1:1 to 50:1 and

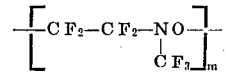 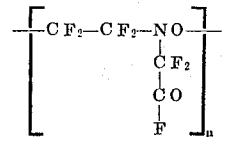

The liquid polymers are appropriately chain-terminated with a chain terminator such as chlorine.

5 Claims, No Drawings

NITROSO ETHER POLYMERS

This invention relates to novel polymers, methods for the production of these polymers, and elastomeric and gum products of the same. More particularly, this invention relates to the copolymerization and terpolymerization of nitroso compounds, such as ether-linkage-containing nitroso compounds with halogenated olefins, the obtaining of carboxylic-group-containing nitroso copolymers, gum products thereof and cured elastomers.

Recent demands for extremely fire resistant materials, especially materials which do not readily burn in an oxygen rich atmosphere, have been prompted by the ready inflammability of conventional polymers in this atmosphere. Moreover, industrial uses have required materials capable of sealing or confining highly corrosive oxidizers.

In answer to these problems, numerous solutions have been proposed, prominent of which has been the proposal to use nitroso rubbers which are the crosslinked products of a polymer consisting of recurring units derived from a nitroso perfluoro compound, a nitroso perfluoro carboxylic acid, and a halogeno olefin.

Despite a number of attractive properties of these elastomers, applications of these polymers have not been widespread. A major reason for the dearth of applications for this attractive elastomer has been the prohibitive expense associated with the production of these elastomers. Thus, one of the major problems has resided in the incorporating of a crosslinkable moiety in the nitroso copolymer.

Previous art attempts to solve this problem have been directed to first incorporating a crosslinkable moiety in the nitroso copolymer backbone, i.e., a nitroso halo carboxylic acid monomer and second in the discovery of a simpler synthesis step for producing the nitroso halo carboxylic acid monomer.

Although the nitroso perhalocarbon compound has been difficult to synthesize, it has been even harder to synthesize nitroso perhalo carboxylic acid; and the multistep synthesis sequence has been up to this point impossible to circumvent.

It has now been found that the nitroso copolymers may be more easily prepared in fewer total steps in a more economical and better manner. Moreover, it has now been found that the synthesis steps employed have diminished a hazard encountered in the production of these copolymers, i.e., explosions. Still further, it has now been found that some of the copolymers may be crosslinked, i.e., cured without the need for the conversion of the carboxylic acid precursor to the free carboxylic acid. Still further, the polymers are based on a polymer unit, i.e., nitroso perfluoro acetic acid which cannot be produced directly and, hence, which cannot be incorporated directly in the polymer.

Further advantages will be apparent or pointed out in the discussion to follow.

According to the invention, the novel polymers are illustrated as follows by recurring units based on the monomer derivatives:

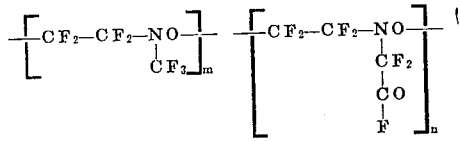

wherein the ratio of $m : n$ is from 0 to 1 to 50 : 1; and

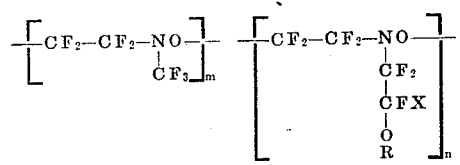

wherein R is lower alkyl, and the ratio of $m : n$ is from 0 : 1 to 50 : 1.

When a radical chain terminator is used, the polymerized products of the present process are liquid nitroso rubber prepolymers having molecular weights below about 20,000 and viscosities ranging from 1,000 to 300,000 cp at 25° C.

These polymers may be represented by the following general formula:

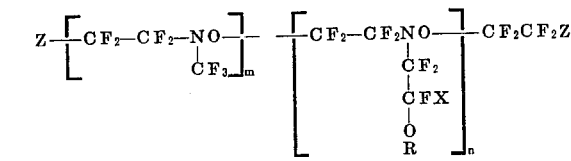

and

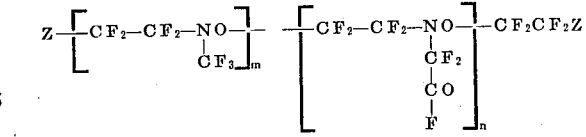

wherein Z is halogen, a perfluoro alkyl radical, —NO or —NO$_2$, and the ratio of $m : p$ is from 0 : 1 to 50 : 1. An optimum ether termonomer derivative constitutes 1 to 15 mole percent, preferably up to about 10 mole percent of ether.

These novel nitroso co- and terpolymers are obtained by the condensation of a perhalo olefin with a nitroso perhalo carbon compound and/or a nitroso ether or acetyl fluoride compound.

As the perhalo olefin monomer in the polymer, perhalogeno olefins may be readily used. Of these the most commonly used and preferred species is tetrafluoro ethylene. Other suitable compounds are of the general formula: $X_2C = CXR$; wherein X is a halogen moiety such as chloro, bromo, or fluoro, preferably fluoro, and R is a halogeno substituted hydrocarbon of up to three carbon atoms, or most desirably a perhalogeno radical, preferably a perfluoro radical.

A representative example of the nitroso perfluoro carbon group of compounds is nitroso trifluoro methane. In general, perfluoro compounds based on carbon compounds with up to five carbon atoms may be employed. However, nitroso trifluoro methane is most commonly employed, and it is also the preferred species. Numerous references are found describing the preparation of this class of monomers and, hence, background information can be readily had from these references.

As a third comonomer in the nitroso polymer, the nitroso ether compounds have been found most useful in place of the nitroso perhalo carboxylic acid. These compounds are represented by the following formula: $ONCX_2—CX_2—OR$ wherein X is a halogeno moiety such as chloro, bromo, or fluoro, and R is a lower alkyl radical. A preferred and most desirable sub-group of these compounds fall within a class described by the following general formula: $ONCF_2—CFX—OR$ wherein X is chlorine, bromine or fluorine, R is a lower alkyl moiety such as methyl, ethyl, propyl, iso-propyl, butyl, iso-butyl, t-butyl, pentyl, hexyl, and heptyl, and isomers of the last three.

The above-defined nitroso perhalo ether monomer may be prepared in a two step sequence illustrated by the following schematic reaction routes:

1. $CF_2 = CF_2 + NaOR \rightarrow CF_2 = CFOR + NaF$
2. $CF_2 = CFOR + NOX \rightarrow ONCF_2CFXOR$ wherein X and R are as defined above. The alkali metal alcholate such as sodium methoxide is readily available as are the nitrosyl compounds. Preparation of these intermediates is known from the prior art.

The preparation of the copolymers and terpolymers is carried out in a heavy wall container such as a Pyrex tube or an autoclave. As a solvent, halogenated hydrocarbon compounds are useful such as methylene chloride. Generally, the solvent and the nitroso ether is introduced into the vessel and the contents cooled to liquid nitrogen temperature. Air from the reaction vessel is evacuated by the freeze-thaw method. Thereafter, the perhalo ethylene is charged to the vessel at a liquid nitrogen temperature (−196° C). If the nitroso perhalo carbon compound is introduced into the vessel in which the reaction is taking place, then it is also cooled to liquid nitrogen temperature to condense it in the vessel.

Reaction temperatures employed in the polymerization step are generally within the range from −60° C to +50° C. A preferred range is from −40° C to −25° C.

In case the formed copolymer or terpolymer tends to build up excessive heat in the reaction such as when a solution-precipitation reaction takes place and when the polymer continues to react in the precipitated phase, improved heat transfer can be achieved if a proper solvent for the polymer is used in addition or in place of methylene chloride.

The polymerization can be carried out in bulk or in an inert organic reaction medium, e.g., methylene chloride or acetone, or in an aqueous suspension. A range of 30 minutes, and less, to 200 hours is encountered for the reaction period, but usually it is between 4 and 90 hours.

In order to obtain liquid polymers, the polymerization is carried out as described above except that a minor amount of a radical chain terminator is employed and the appropriate polymerization method must be employed, i.e., bulk, organic solvent, or an aqueous suspension system. Typical radical chain terminators suitable for use in the polymerization process are: halogens, alkyl halides, nitric oxide, or nitrogen dioxide. As the polymerization reactions used determines the use of a suitable terminator, or vice versa, care should be taken to select the proper type. Thus, if the terminator is nitrogen dioxide, it reacts with water in an aqueous suspension polymerization.

As indicated above, the terminator may be a halogen such as elemental chlorine, bromine or iodine, a perfluoro alkyl halide, preferably a halide wherein the alkyl group contains one to four carbon atoms, e.g., perfluoro methyl chloride, perfluoro ethyl bromide, or perfluoro ethyl iodide, or nitric oxide or nitrogen dioxide. The terminator is used desirably to the extent of 1 to 10 mole percent based on the total moles of monomer in the polymerization reaction mixture. The preferred terminator is elemental chlorine, since it has been found that by using chlorine, a relatively high degree of control of the fluidity of the product polymer can be achieved by varying the amount of chlorine used. The control of molecular weight is adequately illustrated in companion application, Ser. No. 716,360, filed Mar. 27, 1968.

The liquid copolymers and terpolymers are cured through the ether group either directly or by converting the same to an acyl fluoride group or even by converting the latter to a carboxy group and then curing the same.

The nitroso rubbers are particularly outstanding in their resistance to attack by strong oxidizing agents and are of interest as materials for making gaskets, diaphragms, flexible containers and foams, etc., that are exposed to such oxidizing agents.

While such curable rubbers are useful for many of the applications noted above, there are other applications, such as sealing or potting applications, where it is desirable to have a rubber prepolymer in liquid form capable of being cast or otherwise caused to flow into an irregular, confined space and thereafter converted into an elastomer. Thus, elastomers based on nitroso rubbers derived from nitroso perhalo ether compounds have not been previously prepared in solid or fluid form. Moreover, these elastomers have not been prepared as far as it is known from polymers based on recurring units of nitroso perhalo ether monomer derivatives.

Furthermore, since the nitroso ether derivatives containing polymers may be converted partially or substantially fully to acyl fluorides as further set out below, these acyl fluoride moiety containing polymers are also now available in liquid or gum form. The viscosity of these liquid polymers correspond roughly to the viscosities of the ether precursor.

As mentioned before, the ether moiety containing polymer may be converted partially or substantially fully into an acyl fluoride moiety containing polymer. This conversion is accomplished most easily by heating the polymer from 90° to 250° C; or by the addition of a catalyst such as zinc and heating within about the same range; or silver difluoride and heating again within about the same range; the latter catalyst is advantageous for converting the ether moieties to the acyl moieties in the liquid polymers. An alkyl halide is split from the precursor moiety corresponding to the alkyl of the ether moiety and the halogen introduced by the nitrosyl halogen.

As an added facet of this invention, the acyl fluoride moieties pendant from the partially or substantially fully converted ether moiety containing polymer precursor backbone may be converted into a carboxylic moiety by merely hydrolyzing the same with water. A crosslinkable carboxy group is thus obtainable after the formation of the polymer rather than being introduced into the polymer as a moiety of the polymer forming monomer. Again, as mentioned before, these acyl fluoride group containing polymers may be fluids or gums.

The conversion of acyl fluoride as an intermediate step may be dispensed with when the heating and hydrolyzing of the ether polymer is carried out concurrently. As it can be well appreciated, these concurrent reactions are carried out at high temperatures; and hence, the hydrolysis must be carried out under pressure.

Curing of the ether-moiety-containing polymer can be accomplished with epoxy curatives, metal oxides and metal salts, such as chromium III trifluoro acetate. Suitable epoxy curatives are poly-epoxy compounds such as dicyclopentadiene dioxide or compounds of the general formula

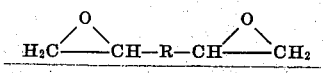

wherein R is an aliphatic or hydrocarbon chain of up to 10 carbon atoms, or an aromatic or alicyclic moiety of up to 10 carbon atoms.

Suitable metal oxides are magnesium oxide which is preferred and calcium oxide, zinc oxide, cadmium oxide or barium oxide as well as mixture of the aforesaid oxides.

Curing of the ether polymer is effected at temperatures up to 250° C although higher temperatures may be used; from 100° C to 200° C is a more suitable temperature range. Generally, the direct curing is accomplished with a suitable catalyst such as zinc powder and chromium trifluoro acetate and heating the polymer for sufficient time, i.e., up to 24 hours, to obtain the elastomer.

The following examples are illustrative of the above-described invention; however, these examples are offered for purpose of depicting the invention and are not to be construed as limiting the broader scope of the described invention.

EXAMPLE 1

A polymer having about 2 mole percent of recurring units derived from nitroso fluoro ether monomer is prepared from 2.0 moles (200 grams) of tetrafluoro ethylene, 1.92 moles (190 grams) of trifluoro nitroso methane and 0.08 moles (15.4 grams) of 1-chloro-2-nitroso-1,2,2 trifluoro ethyl ethyl ether in 1000 ml of methylene chloride at −40° C for 4 days. The polymer is recovered in a 90 percent yield on basis of the monomers used. Heating the terpolymer at 200° to 214° C for several days leads to the formation of the acyl fluoro moiety. This moiety is also confirmed by IR absorption at 5.3 μ. When this polymer is treated with water, it yields carboxylic acid moieties. This polymer is curable with chromium trifluoro acetate salt.

EXAMPLE 2

In a similar manner as outlined in Example 1, a polymer is prepared from the indicated monomers but containing from 3 to 15 mole percent of recurring units derived from a termonomer of the formula $ONCF_2CFClOCH_3$. Heating of this polymer at about 200° C for 3 days yields the acyl fluoride moiety.

EXAMPLE 3

In a similar manner as outlined in Example 1, a polymer is prepared of the indicated monomers but containing from 3 to 15 mole percent of recurring units derived from a termonomer of the formula $ONCF_2CFBrOC_2H_5$. Heating this polymer at 180° C for one week yields the acyl fluoride moiety.

EXAMPLE 4

In a similar manner as outlined in Example 1, a polymer is prepared from the indicated monomers but containing from 3 to 15 mole percent of recurring units derived from a termonomer of the formula $ONCF_2CFClO-CH(CH_3)_2$. Heating this polymer at about 214° C for about 16 hours yields the acyl fluoride moiety containing polymer. Using zinc powder on a polymer with 2 mole percent of the same recurring units of terpolymer at 180° to 195° C yields the acyl-fluoride-moiety-containing polymer in 8 hours.

EXAMPLE 5

In a manner similar to that outlined in Examples 1 and 2, but employing as a termonomer a compound of the general formula $ONCF_2CFBrO-CH-CH_3-CH_3$, a polymer is obtained containing 3 mole percent of recurring units based on the above termonomer. Heating this termonomer at 175° C for 48 hours yields the acyl fluoride containing moiety.

EXAMPLE 6

In a similar manner as outlined in Example 1, a polymer is prepared from the indicated monomers containing from 5 mole percent of recurring units derived from a termonomer of the formula

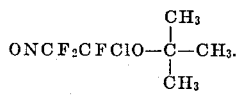

When the obtained polymer is heated for 30 minutes at 100° C to 140° C, the acyl fluoride containing moiety was obtained. Hence, the polymer incorporating recurring units derived from the t-butyl ether monomer is the most suitable polymer for direct conversion to the acyl fluoride moiety. The last conversion is accomplished by dissolving the obtained polymer in Freon and treating the solution with water. The polymers thus treated contained 2.80 percent of acid groups as determined by titration.

EXAMPLE 7

A liquid terpolymer containing recurring units derived from 10 mole percent of 1-chloro-2nitrose-1,2,2,-trifluoro ethyl ethyl ether was prepared by condensing in a 1,000 ml size, heavy-walled Pyrex polymerization vessel 2.0 moles tetrafluoro ethylene, 1.6 moles of trifluoro nitroso methane, 0.4 moles of the above-named monomer, and 0.2 moles of chlorine gas. After reacting, a liquid terpolymer is obtained which is catalytically converted to a polymer containing the acyl fluoride group by using silver difluoride, $AgF_2$, at 140° to 150° C. Typically, to a polymer containing recurring units derived from 10 mole percent of the above termonomer, 20 grams of silver difluoride is added in small portions at 140° C and under a vacuum until foaming ceases to occur, i.e., bubbling stops. About 16 to 20 hours are required to achieve this. The terpolymer liquid is then hydrolyzed with water, dried, and cured by means of the above-identified curatives.

As mentioned before, the method for preparing the liquid polymers is described in companion application Ser. No. 716,360, filed Mar. 27, 1968, and reference can also be had to this disclosure for understanding the obtaining of polymers with varying degrees of fluidity.

EXAMPLE 8

This example describes the preparation of a liquid polymer when using acetone as a solvent. Thus, liquid monomer of the general formula $ONCF_2CFClOC_2H_5$ (19.1 grams or 0.1 mole) and as a solvent 222 ml of acetone were charged to a 500 ml capacity Pyrex reaction vessel and degassed by the freeze-thaw method. $CF_3NO$ (39.6 grams, 0.40 mole), $C_2F_4$ (50.0 grams, 0.50 mole) and $NO_2$ (0.23 gram, 0.005 mole) were condensed in the reaction vessel at liquid nitrogen temperature; the reaction vessel was sealed and shaken for 90 hours at −40° C. The product was obtained as a clear, colorless liquid weighing 67 grams and yielding 60 percent of the polymer. Infrared analysis indicated it to be the desired terpolymer with absorption bands at 3.35 $\mu$ for = CH and 7.3 microns for = C — $CH_3$.

In evaluating the properties of the cured polymer, the conventional analysis methods, i.e., ASTM methods, prevalent in this art are employed. The viscosity data for the liquid polymer and the corresponding molecular weights are based on viscosity measurements carried out in a Brookfield visometer on similar polymer displaying approximate viscosity-molecular weight correlations applicable to the polymers herein. On basis of these data, the molecular weights of the liquid polymers are generally below about 20,000 while the molecular weights of the solids, i.e., gums, range up to 500,000, with 300,000 being a fairly representative upper range, the lower range being defined above. Of course, a sharp demarcation is not encountered and, hence, these ranges must be so understood.

It is, of course, to be understood that the foregoing examples are intended merely as illustrations of the invention and that numerous changes may be made in the ingredients, proportions, and conditions set forth therein without departing from the spirit of the invention as defined in the appended claims.

What is claimed is:

1. A curable nitroso prepolymer of a molecular weight of 20,000 up to 500,000 having a structure represented by the recurring units of the general formula

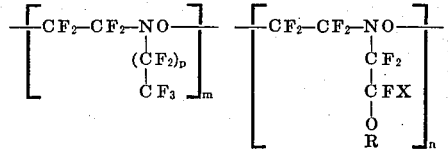

wherein R is lower alkyl of one to seven carbon atoms and $p$ is zero to four; X is chloro, bromo or fluoro; and the ratio of $m : n$ in the prepolymer is 1 : 1 to 50 : 1.

2. The polymer as defined in Claim 1 and wherein R is t-butyl.

3. A curable liquid nitroso prepolymer having a structure represented by the recurring units of the general formula

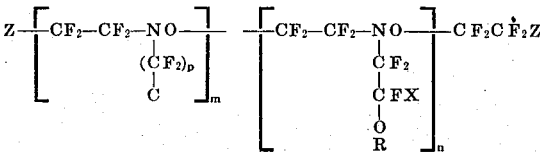

wherein R is lower alkyl of one to seven carbon atoms; $p$ is zero to four; X is chloro, bromo or fluoro; Z is a halogen, perfluoro alkyl, —NO or —$NO_2$ and the ratio of $m : n$ is from 1 : 1 to 50 : 1.

4. A liquid prepolymer according to claim 3 wherein the molecular weight is below 20,000 and the viscosity is from 1,000 to 300,000 cp at 25° C.

5. The polymer as defined in claim 3 and wherein R is t-butyl.

UNITED STATES PATENT OFFICE
CERTIFICATE OF CORRECTION

Patent No. 3,679,755          Dated July 25, 1972

Inventor(s) Nathan Mayes and Robert A. Falk

It is certified that error appears in the above-identified patent and that said Letters Patent are hereby corrected as shown below:

Please correct the formula in column 6, lines 53 to 59, to read as follows:

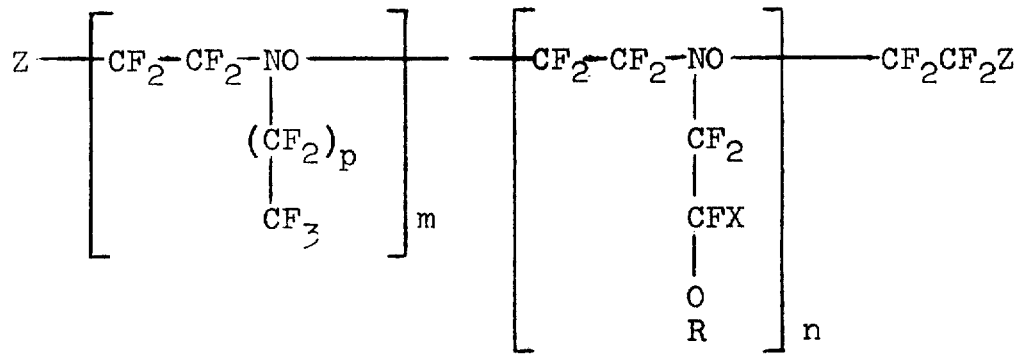

Signed and sealed this 13th day of March 1973.

(SEAL)
Attest:

EDWARD M. FLETCHER, JR.          ROBERT GOTTSCHALK
Attesting Officer          Commissioner of Patents